(No Model.)
T. L. WEBSTER.
VALVE DEVICE.
No. 536,245. Patented Mar. 26, 1895.
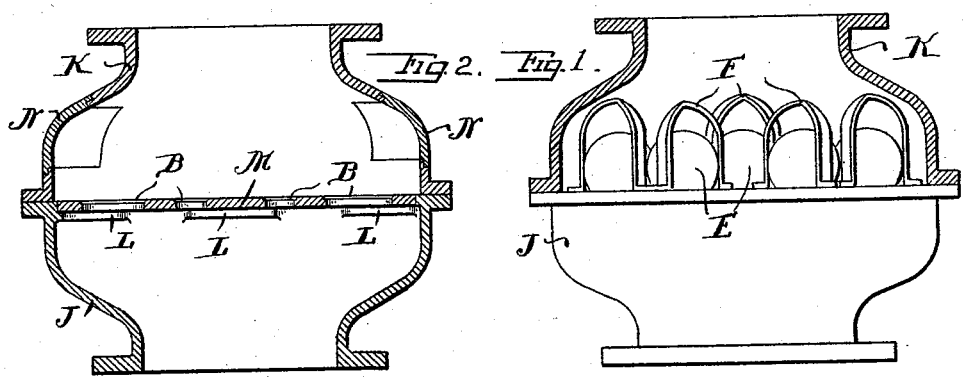
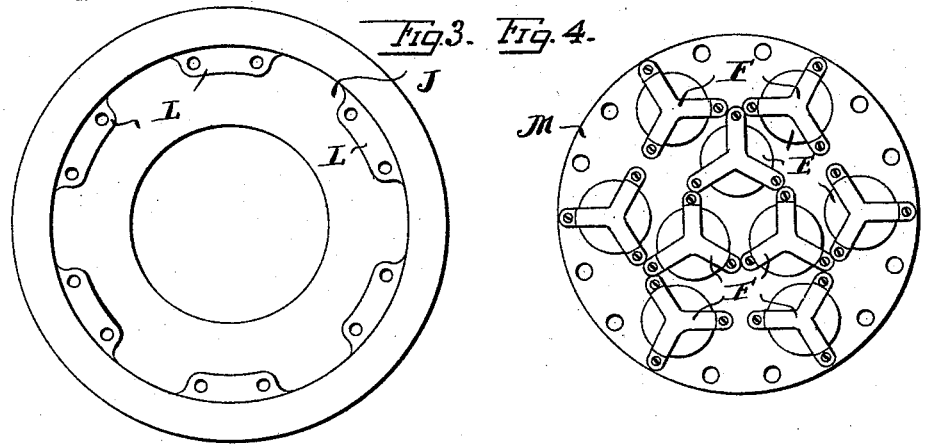
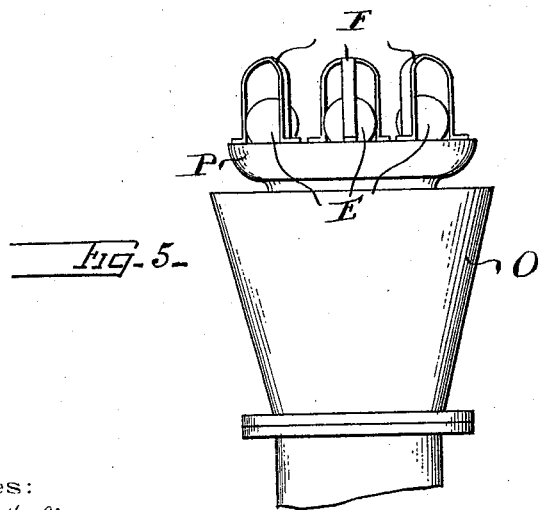
Witnesses:
Jesse B. Heller.
Inventor.
Theodor L. Webster
Attorney.

UNITED STATES PATENT OFFICE.

THEODORE L. WEBSTER, OF MERCHANTVILLE, NEW JERSEY.

VALVE DEVICE.

SPECIFICATION forming part of Letters Patent No. 536,245, dated March 26, 1895.

Application filed April 18, 1894. Serial No. 507,972. (No model.)

*To all whom it may concern:*

Be it known that I, THEODORE L. WEBSTER, of Merchantville, county of Camden, and State of New Jersey, have invented an Improvement in Valve Devices, of which the following is a specification.

My invention relates to valve devices and consists of certain improvements which are fully set forth in the following specification and are shown in the accompanying drawings.

My invention is particularly intended for steam exhaust pipes and is designed to act automatically as an atmospheric check or pressure relief valve. It may be employed with the exhaust pipe of a non-condensing engine for the purpose of automatically relieving the pressure in excess of a given resistance, and with the relief pipe of a condensing engine for the purpose of preventing the admission of atmosphere, but relieving the back pressure whenever the condenser may fail to operate properly.

Figure 1 is a side elevation of my improved valve device with part of the inclosing casing in vertical section to expose the valve balls and their retaining frames. Fig. 2 is a vertical sectional view of the same, omitting the valve balls and their retaining frames. Fig. 3 is a plan view of one member of the casing shown in Figs. 1 and 2. Fig. 4 is a plan view of the seat plate with the valve walls carried thereby; and Fig. 5 is a side elevation of an exhaust head having my improved valve device applied.

M is a horizontal seat plate arranged over the exhaust outlet of the pipe and of an area greater than the area of the exhaust opening. This horizontal plate M is provided with a series of valve seats or openings B, the aggregate area of these openings being not less than the area of the exhaust pipe opening. In the construction shown in Figs. 1, 2 and 3 the plate M is located in an enlarged casing formed of the two members J and K and is shown supported by lugs L on the casing J. The casing J which communicates with the exhaust pipe is enlarged to receive the enlarged seat plate.

E are the valve pieces which consist of a spherical or substantially spherical ball of larger diameter than the diameter of the seats B and adapted to fit the seat snugly and make a tight closure. The balls should be composed of material which will not be subject to injury or change by exposure to moisture or the atmosphere and which will noiselessly close upon the seats, or substantially so. I prefer to construct the balls E of vulcanized rubber. One of these balls is supported upon each seat B on the upper face of the horizontal plate M. The balls are independent of one another.

F are retaining yokes or frames, preferably of the construction shown, i. e., composed of three curved arms united at the top and provided on their ends with lugs by which they may be fastened to the seat plate M, one over each of the balls E. These yokes or frames permit the balls to move from their seats and retain and guide them in their movements.

Whenever the pressure in the exhaust pipe exceeds a given pressure it will lift the series of balls B and thus open the valve and release the excessive pressure. The instant the pressure is relieved the balls will drop back again upon their seats and the valve will be closed to the inflow of the atmosphere. The apparatus thus operates as a pressure relief and atmospheric check valve. When applied to the relief pipe of the condensing engine the balls keep the pipe closed while the condenser is acting properly and therefore do not destroy the partial vacuum produced, but whenever the condenser fails to operate properly so that there would be an accumulation of back pressure upon the engine it is instantly relieved by the raising of the balls.

By the use of a series of small balls in the manner described the pressure may be very easily and accurately regulated, and as the balls operate independently a serious defect in operation will not result if any one of the balls should become fast to its seat.

The casing which contains the valve device in the construction shown in Figs. 1, 2 and 3 may be provided with one or more doors or openings N to admit of access to the valves.

In Fig. 5 the valve devices are shown applied to an ordinary exhaust head O, the seat plate being carried upon a suitable frame P from the opening of the head.

The minor details shown may be varied without departing from the invention.

What I claim as new, and desire to secure by Letters Patent, is—

The combined automatic pressure relief and atmospheric check valve for exhaust steam pipes, composed of a seat plate M of an area larger than the exhaust opening of the exhaust pipe located in a horizontal position above the said exhaust outlet, and provided with a series of small openings B, the aggregate area of said openings being not less than the area of the exhaust outlet of the exhaust pipe, a series of valve balls E supported on the horizontal seat plate and adapted, one to each of the seats B thereof, and a series of retaining yokes or frames F carried by the upper face of said seat plate and located one over each of the said valve balls E.

In testimony of which invention I hereunto set my hand.

THEO. L. WEBSTER.

Witnesses:
ERNEST HOWARD HUNTER,
C. H. NEWCOMB.